(12) United States Patent
Jones et al.

(10) Patent No.: US 7,481,237 B2
(45) Date of Patent: Jan. 27, 2009

(54) SYSTEM AND METHOD FOR MONITORING THE PERFORMANCE OF AN INERT GAS DISTRIBUTION SYSTEM

(75) Inventors: Philip E. Jones, Naples, FL (US); Michael J. O'Hara, Naples, FL (US); Brian P. Greenawalt, Naples, FL (US)

(73) Assignee: Parker-Hannifin Corporation, Cleveland, OH (US)

( * ) Notice: Subject to any disclaimer, the term of this patent is extended or adjusted under 35 U.S.C. 154(b) by 356 days.

(21) Appl. No.: 11/327,268

(22) Filed: Jan. 6, 2006

(65) Prior Publication Data

US 2006/0254643 A1 Nov. 16, 2006

Related U.S. Application Data

(63) Continuation of application No. 10/825,354, filed on Apr. 14, 2004, now Pat. No. 7,013,905.

(51) Int. Cl.
*B67D 5/54* (2006.01)
(52) U.S. Cl. ............... 137/12; 137/209; 137/554; 137/557; 73/23.2; 220/88.3
(58) Field of Classification Search .......... 137/209, 137/557, 554, 1, 12; 73/23.2; 220/88.3
See application file for complete search history.

(56) References Cited

U.S. PATENT DOCUMENTS

| 3,691,730 | A | | 9/1972 | Hickey et al. | |
|---|---|---|---|---|---|
| 4,139,339 | A | * | 2/1979 | Straitz, III | 431/202 |
| 5,057,822 | A | * | 10/1991 | Hoffman | 340/611 |
| 5,998,012 | A | * | 12/1999 | Friese et al. | 428/325 |
| 6,012,533 | A | | 1/2000 | Cramer | |
| 6,547,188 | B2 | | 4/2003 | Schmultz et al. | |
| 6,558,823 | B1 | | 5/2003 | Pinney | |
| 6,604,558 | B2 | | 8/2003 | Sauer | |

(Continued)

FOREIGN PATENT DOCUMENTS

GB 2374007 A 9/2002

OTHER PUBLICATIONS

Shin-Juh Chen and Joe A,. Silver, "Detection of Explosive Mixtures in the Ullage of Aircraft Fuel Tanks", 42nd AIAA Aerospace Sciences Meeting and Exhibit, Jan. 5-8, 2004.

*Primary Examiner*—Kevin L Lee
(74) *Attorney, Agent, or Firm*—Morgan, Lewis & Bockius LLP

(57) ABSTRACT

The gas monitoring system may include a gas line, an oxygen sensor, a filter, a pump, a indicator, and a controller. The gas line is configured to convey gas from a space configured to receive inert gas to a location remote from the space. The oxygen sensor is fluidly coupled to the gas line at the location. The oxygen sensor is configured to determine a partial pressure of oxygen present in the gas. The filter is fluidly coupled to the gas line between the space and the location. The filter is configured to remove combustible contaminants from the gas before it reaches the oxygen sensor. The controller is electrically coupled to the oxygen sensor and to the indicator. The controller is configured to activate the indicator when the partial pressure of oxygen exceeds a predetermined level.

32 Claims, 4 Drawing Sheets

U.S. PATENT DOCUMENTS

| | | |
|---|---|---|
| 6,634,598 B2 | 10/2003 | Susko |
| 6,698,692 B1 | 3/2004 | Tichenor et al. |
| 6,739,399 B2 | 5/2004 | Wagner et al. |
| 2004/0000353 A1 | 1/2004 | Jones |
| 2004/0035461 A1 | 2/2004 | Susko |

* cited by examiner

SYSTEM AND METHOD FOR MONITORING THE PERFORMANCE OF AN INERT GAS DISTRIBUTION SYSTEM

RELATED APPLICATIONS

This application is a continuation of prior application Ser. No. 10/825,354, filed Apr. 14, 2004, now U.S. Pat. No. 7,013,905 which is hereby incorporated by reference in its entirety.

BACKGROUND OF THE INVENTION

1. Field of the Invention

The invention relates generally to inert gas distribution systems, such as those used on aircraft. More specifically, the invention relates to a system and method for monitoring and/or controlling an inert gas distribution system.

2. Description of Related Art

The energy requirements of most modern aircraft are supplied by combusting aviation gasoline, which is typically stored in fuel tanks within an aircraft's wings. Such fuel tanks also contain an explosive fuel/oxygen mixture in the area above the fuel, otherwise known as the ullage. Accordingly, many systems have been developed to reduce the danger of accidentally igniting this fuel/oxygen mixture.

One way of addressing such a danger is to replace the explosive fuel/oxygen mixture with a nonflammable inert gas, usually nitrogen. One method to accomplish this is the On-board Inert Gas Generating System (OBIGGS), which separates nitrogen from local, ambient air and replaces the fuel/air mixture in the ullage with this nitrogen. An example of such as OBIGGS is disclosed in co-pending U.S. patent application Ser. No. 10/308,971, now U.S. Pat. No. 6,729,359, which is incorporated herein in its entirety.

Military aircraft have used OBIGGS for many years to protect against fuel tank explosions caused by extreme aircraft operation and exposure to small arms fire. However, military aircraft are not the only aircraft that would benefit from OBIGGS. For example, investigations into the cause of recent air disasters have concluded that unknown sources may be responsible for fuel tank ignition and explosion. Subsequently, OBIGGS has been evaluated as a way to protect commercial aircraft against such fuel tank explosions caused by any ignition source.

Current systems that monitor the performance (health) or effectiveness of inert gas generating systems, monitor the oxygen concentration, flow and/or pressure of the Nitrogen Enriched Air (NEA) output from the inert gas generating system. Using this data, together with predictive analysis, the oxygen concentration of the space is determined. As this is done by using both performance data and analysis, the oxygen concentration in the space is inferred, rather than measured directly. This inferred oxygen concentration is often inaccurate or incorrect, thereby negating any value that the monitoring system may have.

Furthermore, current oxygen sensor technology is incompatible with hydrocarbons and, therefore, generally cannot be placed directly into a fuel tank. This is because current oxygen sensors operate at elevated temperatures, which presents a serious explosion risk within the fuel tank.

In light of the above, it would be highly desirable to provide a system and method for monitoring the performance of an inert gas distribution system that directly senses the gas within a space to be inerted, while using standard sensor technology.

SUMMARY OF THE INVENTION

The present invention monitors the performance or health of an inert gas generating system and its effectiveness in inerting a space, such as an ullage. A sampling tube or gas line is fluidly coupled to the space that is to be inerted. This gas line is protected against fluid/contaminant ingestion with float and check valves installed near the inlet of the gas line. The gas line may also contain a flame arrestor to prevent an ignition source being introduced through the gas line. A tee preferably connects the gas line to a port that is open to the local or ambient atmosphere. This gas line contains a first isolation valve (or comparable valve, i.e. shuttle valve) that opens or closes the gas line to the atmosphere. In the gas line, outside of the space to be inerted, a second isolation valve is provided to opens or closes the gas line to the space to be inerted. Before or after the tee, a filter may be provided to remove combustible contaminants, such as hydrocarbons or fuel vapors, that may be present in the sample stream. An oxygen sensor is preferably installed just after the filter. A pump or similar device is used to convey gas from the space upstream of the oxygen sensor, thereafter discharging its output overboard.

Periodically, or at a specified time(s) during the flight, the first isolation valve opens the tube to the atmosphere and the pump causes flow of ambient air to pass by the oxygen sensor for verification. Ambient air has a known oxygen concentration of approximately 21% oxygen. If the ambient sensed air is not at 21% oxygen, an alarm signal is generated and the monitoring is either terminated, or the oxygen sensor reverified. After verification, the first isolation valve closes and the second isolation valve is opened. After a specified period, the sensor measures and/or reports the oxygen concentration.

Such a monitoring system is preferably mounted in a convenient area close to the fuel tanks, such as in the landing gear bay. Such a location provides and unpressurized area, which is easily accessible for maintenance.

Accordingly, the present invention monitors the inert gas system by determining the oxygen concentration in a space to be inerted instead of inferring the oxygen concentration from the inert gas generating system output. Therefore, any oxygen, flow or pressure sensor normally used downstream of the inerting system can be eliminated. Also, the oxygen sensor can be easily verified prior to each reading, thereby reducing false readings or measurements.

Furthermore, the oxygen measuring system preferably only operates at specific critical time(s) during the flight, such as during descent, and not continuously. This improves the life and maintainability of the filter/sensor. More frequent or constant monitoring determines that the space is sufficiently inert and that the inerting system may be shut-off to conserve energy, system life, and bleed air usage. Additionally more frequent or constant monitoring could also determine if there are any abnormal changes in the oxygen concentration that could indicate a problem with the inert gas generating system.

In addition, standard oxygen sensor technology is used and not costly and specialized oxygen sensor technology for hydrocarbon rich air spaces. Still further, the system can be safely mounted in an area outside of the fuel tanks, with easy access for filter replacement. Finally, the oxygen concentration is measured directly and not inferred. This increases the accuracy and value of the monitoring system.

In other words, the invention provides a gas monitoring system. The gas monitoring system may include a gas line, an oxygen sensor, a filter, a pump, a indicator, and a controller. The gas line is configured to convey gas from a space configured to receive inert gas to a location remote from the space.

The oxygen sensor is fluidly coupled to the gas line at the location. The oxygen sensor is configured to determine a partial pressure of oxygen present in the gas. The filter is fluidly coupled to the gas line between the space and the location. The filter is configured to remove combustible contaminants, such as hydrocarbons or fuel vapors, from the gas before it reaches the oxygen sensor. The controller is electrically coupled to the oxygen sensor and to the indicator. The controller is configured to activate the indicator when the partial pressure of oxygen exceeds a predetermined level.

According to the invention there is also provided a method for monitoring an inert gas system. Gas is conveyed from a space configured to receive inert gas to a location remote from the space. A percentage of oxygen present in the gas is then sensed at the location. An indication is supplied when the percentage of oxygen exceeds a predetermined level.

Finally, according to the invention there is provided a controller for monitoring an inert gas system. The controller includes a processor, communication circuitry for communicating with at least an oxygen sensor and an indicator, and a memory. The memory includes instructions for performing the method of the invention including monitoring procedures for conveying gas from a space configured to receive inert gas to a location remote from the space, and for sensing at the location a percentage of oxygen present in the gas. The memory also contains alarm procedures for supplying an indication when the percentage of oxygen exceeds a predetermined level.

In light of the above, it can clearly be seen that the above described system and method improves efficiency, reduces the dependence on system resources, improves system reliability, reduces operation cost, and helps ensure compliance with safety regulations, all while reducing the risk of explosion.

BRIEF DESCRIPTION OF THE SEVERAL VIEWS OF THE DRAWINGS

The foregoing and other aspects and advantages of the present invention will be better understood from the following detailed description when read in conjunction with the drawings, in which.

Like reference numerals refer to corresponding parts throughout the several views of the drawings.

DETAILED DESCRIPTION OF THE PREFERRED EMBODIMENTS

Figure 1:
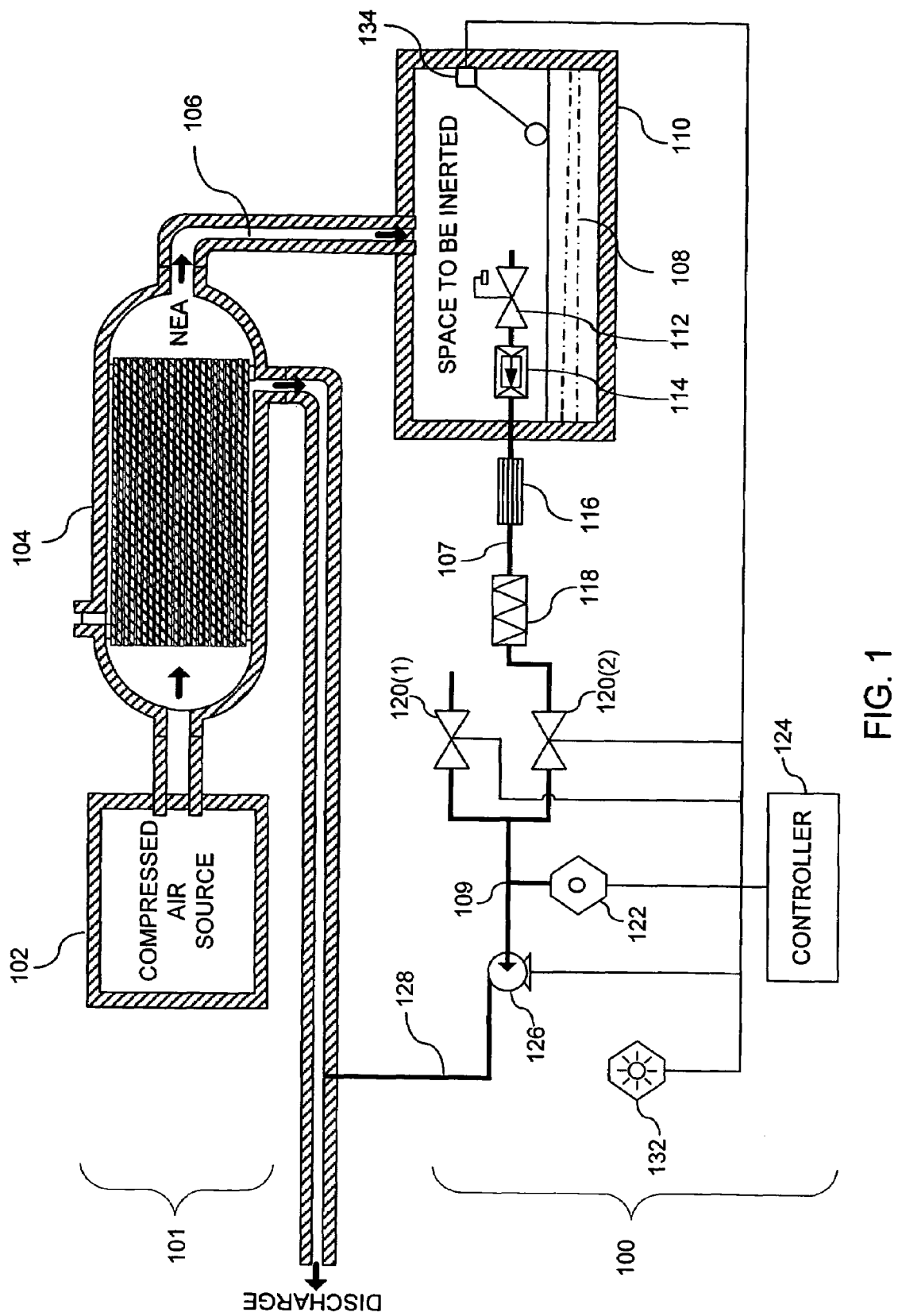
FIG. 1 is a schematic view of a gas monitoring system, according to an embodiment of the invention.

FIG. 1 is a schematic view of a gas monitoring system 100. The gas monitoring system 100 monitors and in some embodiments controls an inert gas system 101. Inert gas generating systems are typically used to inject nitrogen or other inert gasses into the ullage of fuel tanks and/or cargo spaces of aircraft. This inert gas displaces and/or mixes with the gas currently in the space, thereby lowering the oxygen concentration of gas in the space and inerting the gas within the space to reduce explosion hazards.

The inert gas system 101 may be any system for generating and/or distributing inert gas. For ease of explanation, FIG. 1 shows an example of an inert gas system 101 that includes a source of compressed air 102 and an air separation module (ASM) 104. The source of compressed air 102 may be aircraft engine bleed air, which is typically supplied from taps in the turbine section of the aircraft engines at temperatures in the range of 300 degree F.-400 degree F. and at pressures in the range of 10-45 psig depending on turbine rotation speed. Other compressed air sources include air obtained from compressors, a scoop on the surface of the aircraft's skin, or the like.

In use, compressed air obtained from the compressed air source 102 is fed directly into the ASM 104. The ASM 104 filters oxygen or oxygen enriched air (OEA) out of the compressed air, which is typically discharged from the aircraft, while the nitrogen enriched air (NEA) is injected into a space 110 to be inerted. The inert gas system may also include heat exchangers, filters, or the like.

The gas monitoring system 100 includes a gas line 107 and an oxygen sensor 122, as described below. The gas line 107 is fluidly coupled to the space 110, i.e., the components are mechanically joined or connected to one another, either directly or in-directly, and allow fluid flow between one another.

In an embodiment where fuel 108 is contained within the space 110 to be inerted, such as in a fuel tank, the gas line 107 is preferably coupled to the space 110 at a position remote from where fuel collects. This is typically at the upper or top side or wall of the space 110. The gas line 107 is fluidly coupled to the space at this position to avoid fuel 108 interfering with or entering the gas line 107. Moreover, the gas line 107 may extend into the space 110 as shown, or the gas line 107 may be coupled to a fitting that is fluidly coupled to the space 110.

The gas line 107 may be any suitable tube or line having suitable dimensions and made from a suitable material. However, the gas line 107 must be able to transport or convey gas and should resist corrosion caused by combustible contaminants, such as hydrocarbons or fuel vapors.

The oxygen sensor 122 is fluidly coupled to the gas line 107 at a location remote from the space 110, hereinafter referred to as the remote location 109. The oxygen sensor 122 is preferably a standard oxygen sensor that operates at elevated temperatures common for such devices. Due to their high operating temperatures, such oxygen sensors generally cannot be placed within the space 110, as the space 100 often contains highly flammable fuel vapors or hydrocarbons. Accordingly, the oxygen sensor 122 is not positioned within the space, but rather positioned at a safe distance from the space 110. Furthermore, additional components, as described below, are preferably provided to substantially eliminate the possibility of flammable material contacting the oxygen sensor 122.

A suitable oxygen sensor is the "zircon" type oxygen sensor that measures oxygen partial pressure. Such a sensor typically contains two zirconium oxide discs and an electrode consisting of two porous platinum discs and a platinum ring form a chamber placed between the other porous platinum electrodes. The unit is placed in a micro-enclosure with a regulated temperature of about 750° C., for example, controlled by as oven heating filament supplied from a 5V-2A source, via a resistance. A voltage generator applied to the first electrode (pump) raises the oxygen pressure in the chamber; the pressure decreases by reversing the current. This voltage is proportional to the reference pressure.

The additional components that substantially eliminate the possibility of flammable material contacting with the oxygen sensor 122 include, a float or float vent valve 112, a check valve 114, a flame arrestor 116, and a filter 118. The float valve or float vet valve 112 is preferably fluidly coupled to the gas line within the space to prevent fuel from entering the gas line 107. The check valve 114 is also fluidly coupled to the gas line 107. The check valve 114 may be positioned within the space 110, as shown, or anywhere along the gas line 107 between the space 110 and the remote location 109. The check valve 114 prevents fluid flow through the check valve 114 in a direction from the remote location 109 towards the space 110. The flame arrestor 116 is also fluidly coupled to the gas line 107 between the remote location 107 and the space 110. The flame arrestor 116 prevents a flame from traveling along the gas line 107 towards and/or into the space 110. Finally, the filter 118 is also fluidly coupled to the gas line 107 along its length between the remote location 107 and the space 110. The filter 118 is configured to remove substantially all flammable vapors or hydrocarbons from gas conveyed from the space 110 along the gas line 107 towards the oxygen sensor 122. In a preferred embodiment, the filter is fluidly coupled anywhere along the gas line 107 between said space 110 and said sensor 122. Furthermore, the filter 118 may comprise two or more individual filters placed adjacent one another or remote from one another. The above mentioned additional components substantially eliminate the potential for combustible contaminants, such as hydrocarbons or fuel vapors, from the space 110 coming into contact with the oxygen sensor 122.

A pump 126 is also preferably fluidly coupled to the gas line 107. The pump 126 is preferably disposed between the remote location 109 and a discharge line 128 for discharging the gas. The discharge line 128 may be fluidly coupled to the ASM's OEA discharge line that dumps the OEA overboard. The pump 126 may be any suitable pump, vacuum, or suction device, such as a rotary pump, a displacement pump, or the like.

The gas monitoring system 100 also preferably includes a first isolation valve 120(1) and a second isolation valve 120(2). The first isolation valve 120(1) is fluidly coupled between the ambient environment (ambient air) and the gas line 107. The second isolation valve 120(2) is fluidly coupled along the gas line between the space 110 and the remote location 107.

The gas monitoring system also includes a controller 124. The controller 124 is preferably electrically coupled to the oxygen sensor 122. The controller 124 may also be electrically coupled to the pump 126, the isolation valves 120(1) and 120(2), the indicator 132, and/or a fuel level gauge located within the space 110 (or the fuel quantity gauging systems currently on the aircraft). The controller 124 is configured to receive electrical signals, such as analog signals, from the oxygen sensor 122 and the fuel level gauge 134. The controller 124 is also configured to transmit signals, such as analog signals, to the isolation valves 120(1) and 120(2), the pump 126, and the indicator 132. In its simplest embodiment, the controller 124 may form part of the oxygen sensor 122. Further details of the controller and the use of the controller are described below in relation to FIGS. 3 and 4.

Figure 2:
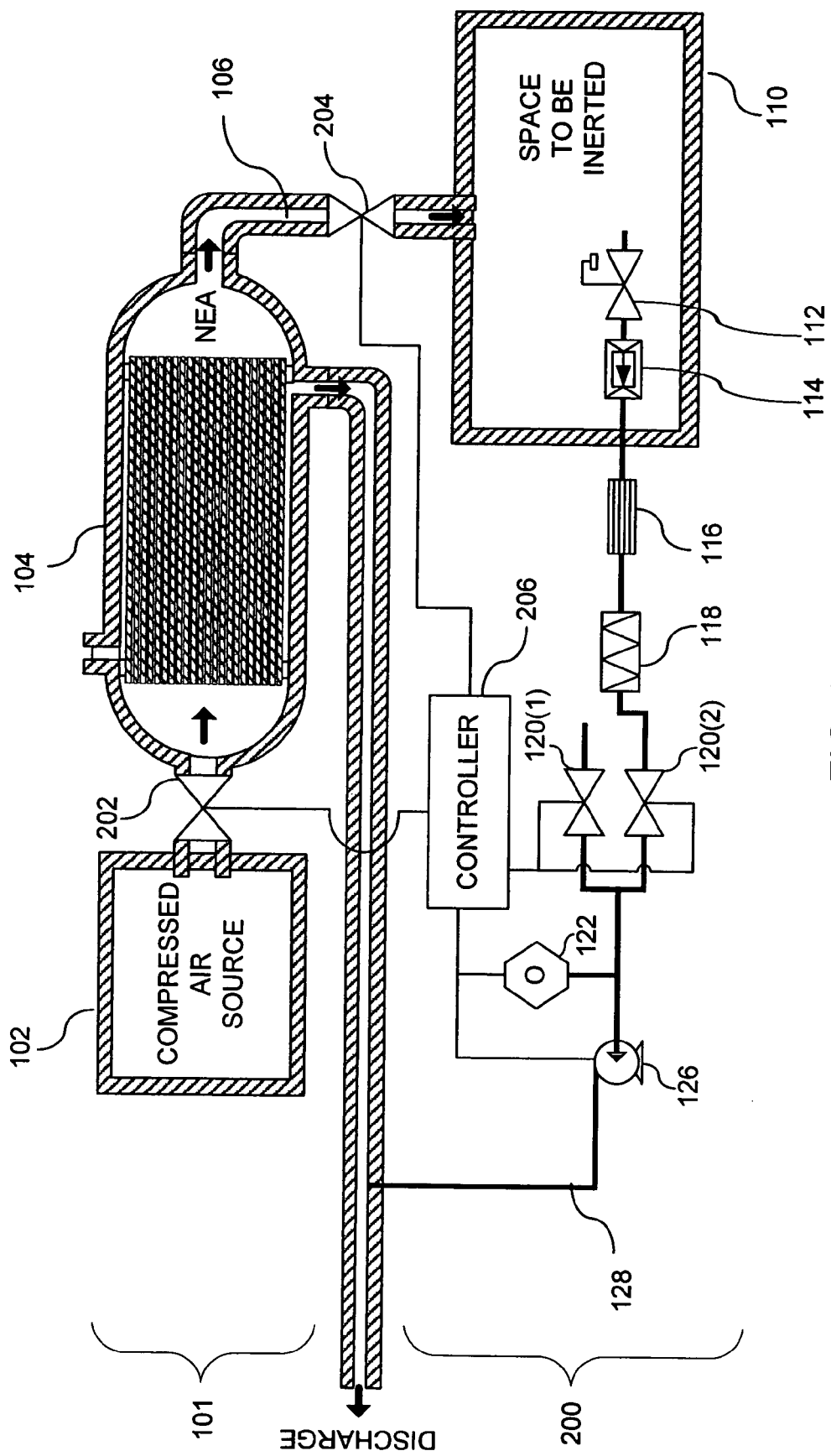
FIG. 2 is a schematic view of another gas monitoring system, according to another embodiment of the invention.

FIG. 2 is a schematic of another gas monitoring system 200 for monitoring and controlling the inert gas system 101. The gas monitoring system 200 is similar to the gas monitoring system 100 shown in FIG. 1. However, in this embodiment, a controller 206 is also coupled to at least one flow adjustment mechanism 202 and/or 204 fluidly coupled to the inert gas system 101. A first flow adjustment mechanism 202 is preferably fluidly coupled between the source of compressed air 102 and the ASM 104. A second flow adjustment mechanism 204 is preferably coupled between the NEA outlet of the ASM and the space 110. The adjustment mechanisms 202 and 204 are any mechanism capable of adjusting the flow of gas, such as valves, pumps, or the like. In use, the controller may adjust the first and/or second adjustment mechanisms based on the partial pressure of oxygen measured by the oxygen sensor 122. Further details of the method for controlling the flow of inert gas into the space are described below in relation to FIG. 4.

Figure 3:
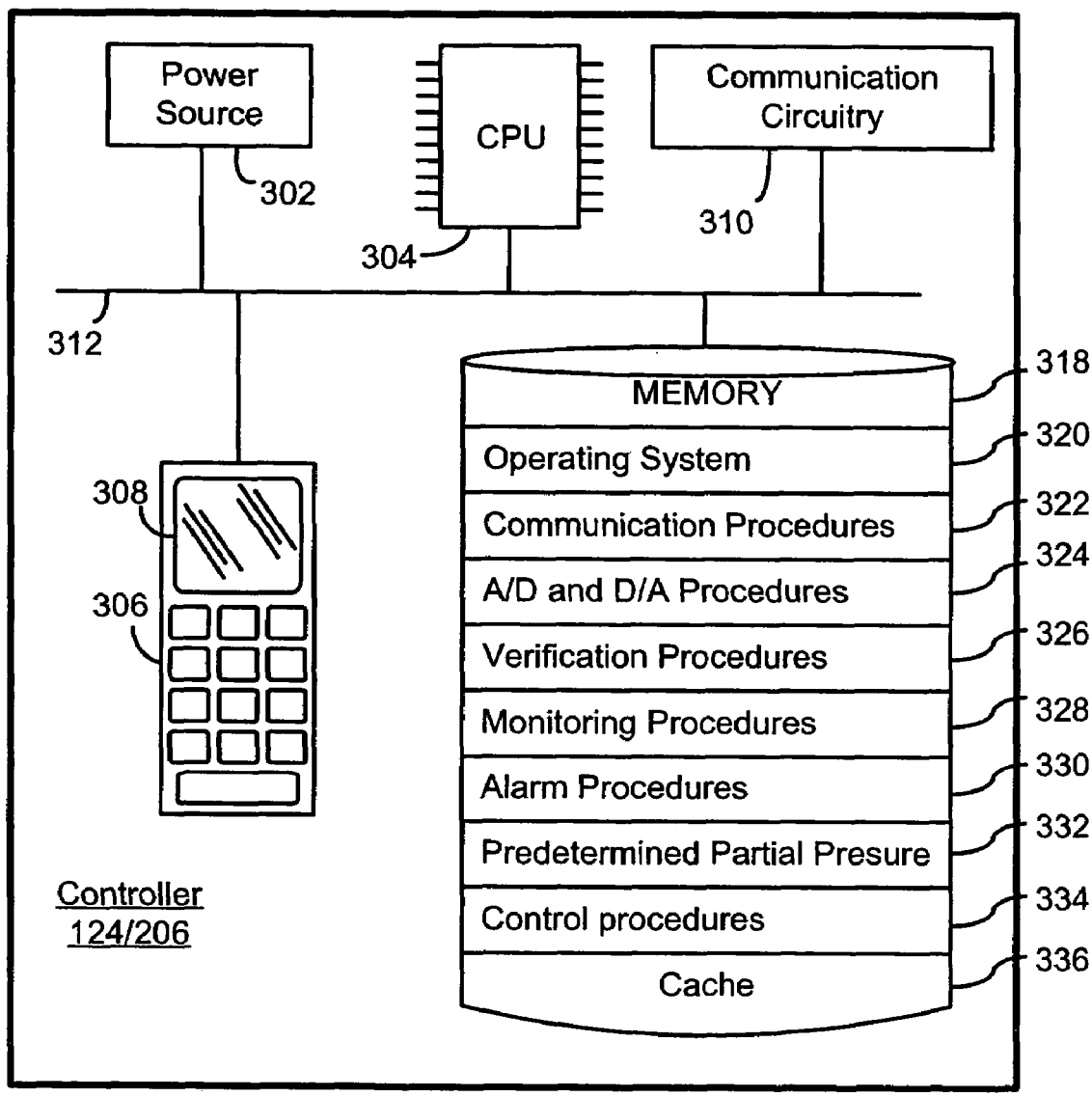
FIG. 3 is a block diagram of the controller shown in FIG. 1.

FIG. 3 is a block diagram of the controllers 124 and 206 shown in FIGS. 1 and 2 respectively. The controller 124 preferably includes: at least one data processor or central processing unit (CPU) 304; a memory 318; communication circuitry 310 for communicating with the oxygen sensor 122, the pump 126, the isolation valves 120(1) and 120(2), the indicator 132, the adjustment mechanisms 202 and 204 (FIG. 2), and/or the fuel level gauge 134; a power source 302 configured to be coupled to a source of power; and at least one bus 312 that interconnects these components. The controller may also optionally include one or more user interface devices, such as a display 308 and a keypad 306.

The memory 318 preferably includes high-speed random access memory and may include non-volatile memory, such as one or more magnetic disk storage devices. The memory 318 preferably stores an operating system 320, such as LINUX®, UNIX® or WINDOWS®, that includes procedures for handling basic system services and for performing hardware-dependent tasks. The memory 318 also preferably stores communication procedures 322 used for communicating with the oxygen sensor 122, the pump 126, the isolation valves 120(1) and 120(2), the indicator 132, the adjustment mechanisms 202 and 204 (FIG. 2), and/or the fuel level gauge 134.

The memory 318 also preferably includes: analog-to-digital and/or digital-to-analog procedures 324 for converting signals between analog and digital regimes (this conversion functionality may be provided in hardware); verification procedures 326 for verifying the oxygen sensor 122 (FIG. 1) and/or the controller 124; monitoring procedures 328 for monitoring the inert gas system 100 (FIG. 1); alarm procedures 330 for alerting a user of hazardous or abnormal conditions; a predetermined partial pressure 332; control procedures 334 for controlling the injection of inert gas into the space 110 (FIG. 1); and/or a cache 336 for temporarily storing data.

Figure 4:
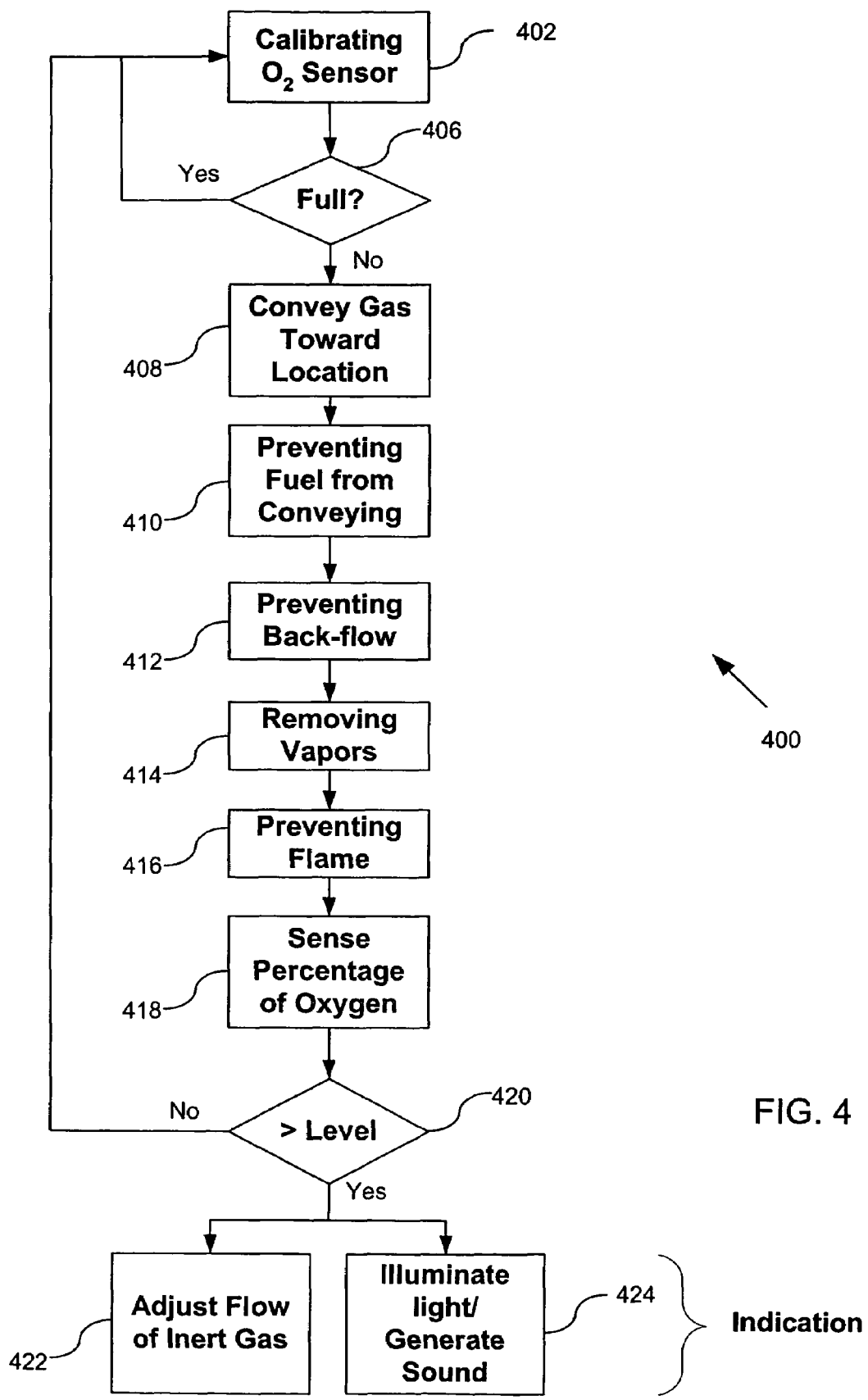
FIG. 4 is a flow chart of a method for monitoring an inert gas system, according to an embodiment of the invention.

FIG. 4 is a flow chart 400 of a method for monitoring and/or controlling an inert gas system 100 (FIG. 1) or 200 (FIG. 2). Initially, the verification procedures 326 (FIG. 3) of the controller 124 (FIG. 1) or 206 (FIG. 2) verify the gas monitoring system at step 402. To do this, the controller closes the second isolation valve 120(2) (FIGS. 1 and 2), thereby preventing gas flow from the space 110 (FIGS. 1 and 2) to the remote location 109 (FIGS. 1 and 2); opens the first isolation valve 120(1), thereby allowing ambient air to flow toward the remote location 109 (FIGS. 1 and 2); activates the pump 126 (FIGS. 1 and 2) to create a pressure differential between the pump 126 (FIGS. 1 and 2) and the ambient air, thereby causing ambient air to flow towards the remote location 109 (FIGS. 1 and 2); and activates the oxygen sensor 122 (FIGS. 1 and 2) to measure the partial pressure of oxygen in the gas flow passing the remote location 109 (FIGS. 1 and 2). As ambient air contains a known percentage of oxygen, approximately 21%, the controller can (1) verify that the oxygen sensor is performing accurately, and (2) adjust or verify the oxygen sensor if it is not accurate.

The monitoring procedures 328 (FIG. 3) of the controller 124 or 206 (FIGS. 1 and 2) may then determine the level of fuel in the space 110 by receiving a fuel level signal from the fuel level gauge 134 (FIG. 1), at step 406. If the fuel level is at a maximum or full, i.e., there is no gas in the ullage above the fuel (406-Yes), then the inert gas monitoring system repeats the method at the verification step 402, at step 405. However, if, as in most cases, there is some gas in the ullage, i.e., the tank is not full with fuel (406-No), then the monitoring procedures 328 (FIG. 3) activate the pump 126 (FIGS. 1 and 2) to convey gas within the space along the gas line 107 (FIGS. 1 and 2) towards the remote location 109 (FIGS. 1 and 2) at step 408. At the same time the float valve 112 (FIGS. 1 and 2) prevents fuel from flowing into the gas line 107 at step 410; the check valve 114 (FIGS. 1 and 2) prevents back-flow of fuel towards the space 110 (FIGS. 1 and 2) at step 412; the filter 118 (FIGS. 1 and 2) removes any combustible contaminants, such as hydrocarbons or fuel vapors, from the gas conveyed along the gas line 107 (FIGS. 1 and 2) at step 414; and the flame arrestor 116 (FIGS. 1 and 2) prevents flames from traveling along the gas line 107 (FIGS. 1 and 2) and into the space 110 (FIGS. 1 and 2) at step 416.

The oxygen sensor 122 (FIGS. 1 and 2) under control of the monitoring procedures 326 (FIG. 3) then measures the oxygen concentration, flow and/or partial pressure within the gas received from the space 110 (FIGS. 1 and 2) at step 418. In a preferred embodiment, this data, together with predictive analysis, is used to determine the oxygen concentration of the gas in the space 110 (FIGS. 1 and 2). As this is done by using both performance data and analysis, the oxygen concentration in the space is preferably inferred, rather than measured directly. This allows the use of current oxygen sensor technology, which is incompatible with hydrocarbons and generally cannot be used in the fuel tank.

The alarm procedures 330 (FIG. 3) then compare the measured partial pressure of oxygen in the gas to a predetermined partial pressure of oxygen 332 (FIG. 3) at step 420. The predetermined partial pressure of oxygen 322 (FIG. 3) is the level above which it has been determined that the gas contains a hazardous amount of oxygen. This value may be set by the system operator, or by an aviation authority. If the level or partial pressure of oxygen in the measured gas is higher than the predetermined level (420-Yes), then the alarm procedures generate an alarm or indication signal. In the embodiment shown in FIG. 1, the indication signal activates the indicator 132 (FIG. 1), such as by illuminating a light or generating an audible warning sound in the cockpit at step 424.

In the embodiment shown in FIG. 2, the indication signal controls the flow variation mechanisms 202 and/or 204 (FIG. 2) to meter the flow of inert gas into the space 110 (FIGS. 1 and 2) at step 422. For example, if the partial pressure of oxygen in the space 110 (FIGS. 1 and 2) is at or above the predetermined partial pressure level 332 (FIG. 3), then the controller 206 (FIG. 2) opens valves to allow more inert gas to be injected into he space 110 (FIG. 2). Accordingly, this embodiment contains a feedback loop for measuring and controlling the flow of inert gas into the space 110 (FIG. 2). The feedback loop may employ any suitable feedback control algorithm, such as a Proportional, Integral, and/or Differential (PID) control algorithm.

If the level or partial pressure of oxygen in the measured gas is lower than the predetermined level (420-No), then the monitoring system loops-back to reverify the system at step 402, as described above.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. For example, the monitoring system and method may be used to accurately determine the health of any space, not just that of aircraft fuel tanks. The embodiments were chosen and described in order to best explain the principles of the invention and its practical applications, to thereby enable others skilled in the art to best utilize the invention and various embodiments with various modifications as are suited to the particular use contemplated. Furthermore, the order of steps in the method are not necessarily intended to occur in the sequence laid out. It is intended that the scope of the invention be defined by the following claims and their equivalents.

What we claim is:

1. A gas monitoring system comprising:
   a gas line configured to convey gas from a space configured to receive inert gas to a location remote from said space;
   an oxygen sensor fluidly coupled to said gas line at said location, where said oxygen sensor is configured to determine a partial pressure of oxygen present in said gas;
   an indicator; and
   a controller electrically coupled to said oxygen sensor and to said indicator, where said controller is configured to activate said indicator when said partial pressure of oxygen exceeds a predetermined level.

2. The gas monitoring system of claim 1, wherein said controller forms part of said oxygen sensor.

3. The gas monitoring system of claim 1, further comprising a pump fluidly coupled to said gas line for conveying said gas from said space to said location.

4. The gas monitoring system of claim 1, wherein said oxygen sensor operates at an elevated temperature.

5. The gas monitoring system of claim 1, wherein said oxygen sensor is a "zircon" type oxygen sensor.

6. A gas monitoring system comprising:
   a gas line configured to convey gas from a space configured to receive inert gas to a location remote from said space:
   an oxygen sensor fluidly coupled to said gas line at said location, where said oxygen sensor is configured to determine a partial pressure of oxygen present in said gas;
   an indicator; and
   a controller electrically coupled to said oxygen sensor and to said indicator, where said controller is configured to activate said indicator when said partial pressure of oxygen exceeds a predetermined level, wherein said controller is configured to electrically couple to a flow adjustment mechanism that meters flow of inert gas into said space based on a signal received from said controller when said partial pressure of oxygen exceeds said predetermined level.

7. The gas monitoring system of claim 6, wherein said adjustment mechanism comprises a valve fluidly coupled between a source of inert gas and said space.

8. The gas monitoring system of claim 6, wherein said adjustment mechanism comprises a valve fluidly coupled between a compressed air source and an air separation module that is fluidly coupled to said space.

9. The gas monitoring system of claim 6, further comprising a filter fluidly coupled to said gas line between said space and said location, where said filter is configured to remove combustible contaminants from said gas before it reaches said oxygen sensor.

10. A gas monitoring system comprising:
    a gas line configured to convey gas from a space configured to receive inert gas to a location remote from said space;

an oxygen sensor fluidly coupled to said gas line at said location, where said oxygen sensor is configured to determine a partial pressure of oxygen present in said gas;

an indicator; and a controller electrically coupled to said oxygen sensor and to said indicator, where said controller is configured to activate said indicator when said partial pressure of oxygen exceeds a predetermined level, further comprising a float valve fluidly coupled to said gas line within said space, where said float valve is configured to prevent fuel contained within said space entering said gas line.

11. A gas monitoring system comprising:

a gas line configured to convey gas from a space configured to receive inert gas to a location remote from said space;

an oxygen sensor fluidly coupled to said gas line at said location, where said oxygen sensor is configured to determine a partial pressure of oxygen present in said gas;

an indicator; and a controller electrically coupled to said oxygen sensor and to said indicator, where said controller is configured to activate said indicator when said partial pressure of oxygen exceeds a predetermined level, further comprising a check valve fluidly coupled between an inlet of said gas line and said location.

12. A gas monitoring system comprising:

a gas line configured to convey gas from a space configured to receive inert gas to a location remote from said space;

an oxygen sensor fluidly coupled to said gas line at said location, where said oxygen sensor is configured to determine a partial pressure of oxygen present in said gas;

an indicator; and a controller electrically coupled to said oxygen sensor and to said indicator, where said controller is configured to activate said indicator when said partial pressure of oxygen exceeds a predetermined level, further comprising a flame arrestor fluidly coupled between an inlet of said gas line and said location.

13. A gas monitoring system comprising:

a gas line configured to convey gas from a space configured to receive inert gas to a location remote from said space;

an oxygen sensor fluidly coupled to said gas line at said location, where said oxygen sensor is configured to determine a partial pressure of oxygen present in said gas;

an indicator; and a controller electrically coupled to said oxygen sensor and to said indicator, where said controller is configured to activate said indicator when said partial pressure of oxygen exceeds a predetermined level, further comprising a pump fluidly coupled to said gas line for conveying said gas from said space to said location, wherein said pump is electrically coupled to said controller, such that said controller can activate said pump periodically.

14. A gas monitoring system comprising:

a gas line configured to convey gas from a space configured to receive inert gas to a location remote from said space;

an oxygen sensor fluidly coupled to said gas line at said location, where said oxygen sensor is configured to determine a partial pressure of oxygen present in said gas;

an indicator; and a controller electrically coupled to said oxygen sensor and to said indicator, where said controller is configured to activate said indicator when said partial pressure of oxygen exceeds a predetermined level, further comprising a fuel level gauge disposed within said space and electrically coupled to said controller.

15. A gas monitoring system comprising:

a gas line configured to convey gas from a space configured to receive inert gas to a location remote from said space;

an oxygen sensor fluidly coupled to said gas line at said location, where said oxygen sensor is configured to determine a partial pressure of oxygen present in said gas;

an indicator;

a controller electrically coupled to said oxygen sensor and to said indicator, where said controller is configured to activate said indicator when said partial pressure of oxygen exceeds a predetermined level;

a first valve coupled between said space and said location; and a second valve coupled between ambient air and said location.

16. The gas monitoring system of claim 15, wherein said first valve and said second valve are electrically coupled to said controller.

17. A gas monitoring system comprising:

a gas line configured to convey gas from a space configured to receive inert gas to a location remote from said space;

an oxygen sensor fluidly coupled to said gas line at said location, where said oxygen sensor is configured to determine a partial pressure of oxygen present in said gas;

an indicator; and a controller electrically coupled to said oxygen sensor and to said indicator, where said controller is configured to activate said indicator when said partial pressure of oxygen exceeds a predetermined level, wherein said controller is electrically coupled to:

a first valve coupled between said space and said location;

a second valve coupled between ambient air and said location;

a pump fluidly coupled to said gas line for conveying said gas from said space to said location; and a fuel level gauge within said space.

18. A method for monitoring an inert gas system, comprising:

conveying gas from a space configured to receive inert gas to a location remote from said space;

sensing at said location a percentage of oxygen present in said gas;

supplying an indication when said percentage of oxygen exceeds a predetermined level.

19. The method of claim 18, further comprising, prior to said sensing, removing combustible contaminants from said gas.

20. The method of claim 18, wherein said conveying further comprises pumping said gas from said space to said location.

21. The method of claim 20, wherein said pumping occurs periodically.

22. The method of claim 18, wherein said supplying further comprises illuminating a warning light or generating an audible sound.

23. A method for monitoring an inert gas system, comprising:

conveying gas from a space configured to receive inert gas to a location remote from said space;

sensing at said location a percentage of oxygen present in said gas;

supplying an indication when said percentage of oxygen exceeds a predetermined level, further comprising, prior to said conveying, preventing fuel contained within said space from being conveyed with said gas.

24. A method for monitoring an inert gas system, comprising:
conveying gas from a space configured to receive inert gas to a location remote from said space;
sensing at said location a percentage of oxygen present in said gas;
supplying an indication when said percentage of oxygen exceeds a predetermined level, further comprising, prior to said sensing, preventing back-flow of said gas towards said space.

25. A method for monitoring an inert gas system, comprising:
conveying gas from a space configured to receive inert gas to a location remote from said space;
sensing at said location a percentage of oxygen present in said gas;
supplying an indication when said percentage of oxygen exceeds a predetermined level, further comprising, prior to said sensing, preventing a flame from traveling from said location and into said space.

26. A method for monitoring an inert gas system, comprising:
conveying gas from a space configured to receive inert gas to a location remote from said space;
sensing at said location a percentage of oxygen present in said gas;
supplying an indication when said percentage of oxygen exceeds a predetermined level, further comprising, prior to said conveying, determining a level of fuel within said space.

27. A method for monitoring an inert gas system, comprising:
conveying gas from a space configured to receive inert gas to a location remote from said space;
sensing at said location a percentage of oxygen present in said gas;
supplying an indication when said percentage of oxygen exceeds a predetermined level, further comprising, metering a flow of inert gas into said space based on indication.

28. A controller for monitoring an inert gas system that conveys gas from a space configured to receive inert gas to a location remote from said space, comprising:
a processor;
communication circuitry for communicating with at least an oxygen sensor And an indicator; and
a memory comprising:
monitoring procedures for sensing at said location a percentage of oxygen present in said gas; and
alarm procedures for supplying an indication when said percentage of oxygen exceeds a predetermined level.

29. The controller of claim 28, wherein said alarm procedures further comprise instructions for illuminating a light or generating an audible warning sound when said percentage of oxygen exceeds a predetermined level.

30. A controller for monitoring an inert gas system that conveys gas from a space configured to receive inert gas to a location remote from said space, comprising:
a processor;
communication circuitry for communicating with at least an oxygen sensor and an indicator; and
a memory comprising:
monitoring procedures for sensing at said location a percentage of oxygen present in said gas; and
alarm procedures for supplying an indication when said percentage of oxygen exceeds a predetermined level, wherein said memory further comprises control procedures for metering a flow of inert gas into said space based on indication.

31. A controller for monitoring an inert gas system that conveys gas from a space configured to receive inert gas to a location remote from said space, comprising:
a processor;
communication circuitry for communicating with at least an oxygen sensor and an indicator; and
a memory comprising:
monitoring procedures for sensing at said location a percentage of oxygen present in said gas; and
alarm procedures for supplying an indication when said percentage of oxygen exceeds a predetermined level, wherein said monitoring procedures further comprise instructions for periodically pumping said gas from said space to said location.

32. A controller for monitoring an inert gas system that conveys gas from a space configured to receive inert gas to a location remote from said space, comprising:
a processor;
communication circuitry for communicating with at least an oxygen sensor and an indicator; and
a memory comprising:
monitoring procedures for sensing at said location a percentage of oxygen present in said gas; and
alarm procedures for supplying an indication when said percentage of oxygen exceeds a predetermined level, wherein said monitoring procedures further comprise instructions for determining a level of fuel within said space.

* * * * *